United States Patent [19]
Shigoku

[11] 4,315,670
[45] Feb. 16, 1982

[54] ZOOM LENS BARREL WITH SINGLE OPERATING RING

[75] Inventor: Masaharu Shigoku, Osaka, Japan

[73] Assignee: Minolta Camera Kabushiki Kaisha, Osaka, Japan

[21] Appl. No.: 91,946

[22] Filed: Nov. 7, 1979

[51] Int. Cl.³ .................. G02B 15/18; G02B 7/04
[52] U.S. Cl. .................................................. 350/429
[58] Field of Search ............................ 350/187, 255

[56] References Cited
U.S. PATENT DOCUMENTS

| | | | |
|---|---|---|---|
| 3,914,026 | 10/1975 | Kanno | 350/255 |
| 3,915,557 | 10/1975 | Shimojima | 350/187 |
| 4,171,880 | 10/1979 | Mori et al. | 350/187 |

Primary Examiner—Jon W. Henry
Attorney, Agent, or Firm—Watson, Cole, Grindle & Watson

[57] ABSTRACT

A zoom lens barrel has incorporated therein an optical system including a first lens group which is moved both for focusing and for zooming by a single operating ring. A first lens moving frame for holding the first movable lens group is provided separately from the operating ring and is restrained from rotation by a focusing mechanism when the operating ring is turned. An attachment mounting portion is provided on the nonrotatable lens moving frame. The first lens group is moved for zooming free of any eccentricity relative to a second lens group. The attachment on the mounting portion is held stationary against rotation despite turning of the operating ring.

10 Claims, 3 Drawing Figures

ZOOM LENS BARREL WITH SINGLE OPERATING RING

BACKGROUND OF THE INVENTION

This invention relates to a zoom lens barrel which is provided with an optical system including a first lens group which is moved for focusing and also for zooming by a single operating ring.

Published Unexamined Japanese Utility Model Application No. Sho 53-82341 discloses a zoom lens barrel of the foregoing type. With the disclosed lens barrel, the lens system and barrel head ring are rotated with the rotation of an operating ring, so that the barrel has the drawback that when the lens system is misaligned even if only slightly, a group of lenses will be shifted to an eccentric position, for example, during zooming. Such a lens barrel has another drawback in that when a polarizing filter or square hood is attached to the barrel head ring, the direction of polarization is likely to change or an eclipse is liable to take place.

Further, since the operating ring also axially shifts during focusing, it is impossible to maintain the axial position of the operating ring per se in corresponding relation to the focal distance. This gives rise to the necessity of providing an additional member such as a focusing scale ring.

It is thus an object of the present invention to eliminate the eccentricity of a first group of movable lenses relative to a second group of movable lenses that would arise during zooming.

Another object of the present invention is to overcome the above-mentioned drawback which occurs when the first group of movable lenses is shifted with an attachment mounted on the barrel head ring.

Still another object of the present invention is to provide a zoom lens barrel of simplified construction which has a single operating ring and in which there is no need to provide an additional member, such as a focusing scale ring, for the indication of both the focal distance and the photographic distance.

SUMMARY OF THE INVENTION

The present invention provides a zoom lens barrel in which a group of focusing lenses and an attachment mounting portion are provided separately from an operating ring and are thereby adapted to be prevented from rotation.

According to this invention, first and second lens groups and an attachment mounting portion are shiftable straightforward without rotation both for focusing and for zooming, so that there is no likelihood that an attachment, such as a polarizing filter, will rotate or that the first and second lens groups will rotate in an eccentric position relative to each other.

Since the lens system can be brought into focus without permitting the axial movement of the operating ring, there is no need to use the separate ring conventionally employed for providing a focusing scale. Thus the contemplated objects are attainable with a simplified construction.

Other objects and features of the invention will become apparent from the following description.

DESCRIPTION OF THE PREFERRED EMBODIMENTS

Figure 1:
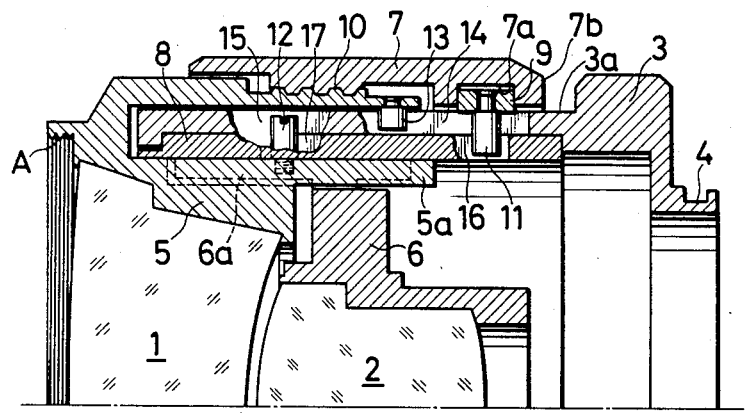
FIG. 1 is a fragmentary view in vertical section showing an embodiment of the invention.

Referring to FIG. 1, which shows one embodiment of lens barrel according to the present invention, the lens barrel is seen to include a first lens group 1 which is movable for both focusing and zooming, a second lens group 2 which is movable for zooming and a stationary cylinder 3 which includes a mount portion 4 to allow it to be attached to a camera main body (not shown). The cylinder 3 may instead be permanently fixed to the camera body.

A first lens moving frame 5 holds the first movable lens group 1. A second lens moving frame 6, which holds the second movable lens group 2, is directly or indirectly fitted in and supported by the stationary cylinder 3, and is movable axially thereof. As shown, the first and second frames 5 and 6 have inter-engaging portions 5a and 6a, the engagement of which restrains the two frames 5 and 6 against rotation relative to each other.

An operating ring 7 is rotatably and axially movably fitted around the stationary cylinder 3 and is screwed on a helicoid portion 10 on an outer cylindrical part of the first frame 5. A cam ring 8 is rotatably fitted in and supported by the stationary cylinder 3. The frames 5 and 6 are axially movably fitted in the cam ring 8. Alternatively, the cam ring 8 may fit around the stationary cylinder 3, with the frames 5 and 6 directly fitted in the stationary cylinder 3.

A zoom ring 9 axially movably fitting around the stationary cylinder 3 is engaged in a circumferential groove 7a in the inner surface of the operating ring 7. The zoom ring 9 remains stationary against the rotation of the operating ring 7 but follows the axial movement of the ring 7.

The zoom ring 9 has a guide pin 11 projecting from its inner periphery, while the second frame 6 has a guide pin 12 projecting from its outer periphery. The cylinder 3 has an axial groove 14 intersecting a cam groove 16 formed in the cam ring 8. The guide pin 11 is engaged in the intersection of the grooves 14 and 16. The other guide pin 12 is engaged in the intersection of an axial groove 15 in the cylinder 3 and a cam groove 17 of the cam ring 8, these grooves being similar to the above grooves 14 and 16. A straightforward shift pin 13 projecting from the inner periphery of the cylindrical portion of the first frame 5 is engaged in the axial groove 14 of the stationary cylinder 3. The shift pin 13 may be engaged in the axial groove 15 or in another axial groove formed separately from the grooves 14 and 15. When such an additional groove is formed for the pin 13, the axial groove 14 may be adapted to act as a cam groove to some extent.

The zooming movement will be described first with reference to FIG. 1.

When the operating ring 7 is axially moved, the first lens moving frame 5 with the helicoid 10 in engagement with the ring 7 axially moves straight together with the operating ring 7 by being guided by the straightforward shift pin 13 and the axial groove 14. The zoom ring 9 also moves with the operating ring 7 by being guided by the guide pin 11 and the axial groove 14. The guide pin 11, which slides along the cam groove 16 at this time, rotates the cam ring 8 in accordance with the shape of the cam groove 16.

With the rotation of the cam ring 8, the second lens moving frame 6 having the guide pin 12 engaged in the intersection of the axial groove 15 and the cam groove 17 is axially moved in accordance with the shape of the cam groove 17.

In this way, the first and second lens groups 1 and 2 and an attachment mounting portion A on the first frame 5 are movable without any rotation. With the cam grooves 16 and 17 properly shaped, the first and second lens groups 1 and 2 are shiftable along the optical axis as specified for the desired zooming movement.

The parts will function in the following manner for focusing. When the operating ring 7 is rotated, the ring 7 engaging the helicoid 10 on the first lens moving frame 5 moves the frame 5 axially straight forward or backward since the frame 5 is restrained from rotation by the shift pin 13 engaged in the axial groove 14. On the other hand, the zoom ring 9, which is held against rotation by the guide pin 11 engaged in the axial groove 14, remains stationary despite the rotation of the operating ring 7. Consequently, the second lens moving frame 6 also remains stationary, and the first movable lens group 1 alone moves along the optical axis for the desired focusing. With the first frame 5 held against rotation also in this case, the attachment mounting portion A does not rotate but moves straightly forward or backward.

Figure 2:
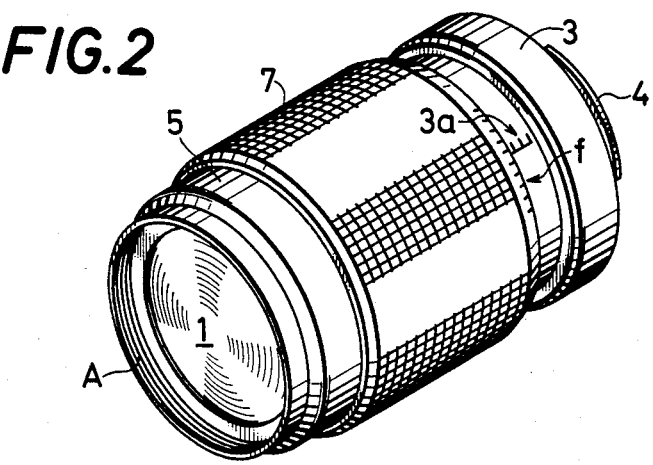
FIG. 2 is a perspective view schematically showing the appearance of the embodiment of FIG. 1.

Indicated at 3a in FIG. 2 is a focal distance scale with its divisions engraved in the outer periphery of the stationary cylinder 3 as arranged axially thereof. The rear end 7b of the operating ring 7 provides a reading. A focusing scale f is marked on the operating ring 7.

Figure 3:
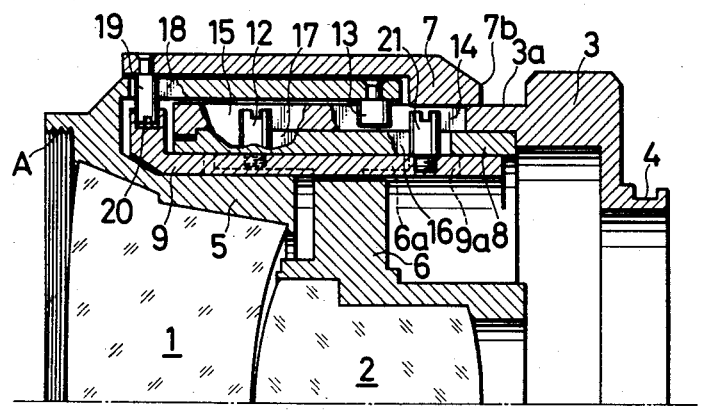
FIG. 3 is a fragmentary view in vertical section showing another embodiment of the invention.

FIG. 3 shows another embodiment of this invention in which the first movable lens group 1 is shiftable for focusing by the engagement of a guide pin 19 in a lead groove 18 without resorting to helicoidal screw engagement.

The guide pin 19 is provided on the inner periphery of the operating ring 7, while the cam groove 18 is formed in the outer cylindrical portion of the first lens moving frame 5. The pin 19 is engaged in the groove 18. The first frame 5 is restrained from rotation in the same manner as in FIG. 1 by the straightforward pin 13 thereof engaged in the axial groove 14 in the cylinder 3 and adapted to guide the frame 5 straight.

The zoom ring 9 shown in FIG. 3 is disposed diametrically inside the cam ring 8 and has at its forward end a flange portion formed with an outer circumferential groove 20. The guide pin 19 on the operating ring 7 is engaged at its free end in the groove 20. The ring 9 has a cylindrical portion with a guide pin 21 which is engaged in the intersection of the cam groove 16 in the cam ring 8 and the axial groove 14 in the stationary cylinder 3. The second lens moving frame 6 has a portion 6a engaged in an axially apertured portion 9a of the zoom ring 9, whereby the two members 6 and 9 are restrained against rotation relative to each other. In FIGS. 1 and 2, like parts are referred to by like reference numerals.

The parts shown in FIG. 3 operate in the following manner for zooming. When the operating ring 7 is axially moved, the zoom ring 9 axially moves by being guided by the guide groove 14 and the guide pin 21, consequently turning the cam ring 8 in accordance with the shape of the cam groove 16 having the pin 21 engaged therein.

The turn of the cam ring 8 causes the guide pin 12 engaged in the cam groove 17 and in the axial groove 15 of the cylinder 3 to axially move the second lens moving frame 6.

Since the first lens moving frame 5 is prevented from rotation by the straightforward shift pin 13 engaged in the axial groove 14, the guide pin 19 engaged in the lead groove 18 axially moves the first frame 5 with the operating ring 7. Thus the first and second lens groups are axially moved relative to each other for the desired zooming, while permitting the attachment mounting portion A to remain against rotation.

When the operating ring 7 is turned for focusing, the first lens moving frame 5, which is held out of rotation, is moved axially forward or backward in accordance with the shape of the lead groove 18 by the engagement of the guide pin 19 on the ring 7 in the lead groove 18, whereby the first lens group 1 is axially shifted as desired. On the other hand, since the guide pin 19 on the operating ring 7 is engaged in the circumferential groove 20 of the zooming ring 9, the torque of the operating ring 7 will not act on the zoom ring 9 during focusing, consequently permitting the second lens moving frame 6 to remain stationary. In this way, the desired focusing movement is effected.

The embodiments may be easily modified by replacing the cam groove by a lead groove or the lead groove by a cam groove. Such a modification is included within the scope of the invention. The number of movable lens groups is not limited to two, but the invention is similarly applicable to an optical system including three or more lens groups.

The mode of retaining or guiding the lens moving frame is not limited to the sleeve fitting method as embodied above, but the frame may be guidable by a rod in the known manner. If the shift pin 13 is engaged in the guide groove 15 or some other axial groove to provide a mechanism for shifting the first lens moving frame straight, the axial groove 14 may be in the form of a lead groove or cam groove.

What is claimed is:

1. A lens barrel which is provided with an optical system having at least two movable lens groups, the first of the movable lens groups being movable for both focusing and zooming, the lens barrel comprising:
    a stationary cylinder having an imaginary central axis therethrough;
    an operating ring supported by the cylinder for both axial movement and rotation about the central axis of the cylinder, the operating ring being adapted to be rotated for focusing and to be axially moved for zooming;
    a first movable frame having an attachment mounting portion at its front end and having means for holding the first movable lens group at its inner portion;
    axial guide means provided between the first movable frame and the cylinder for permitting only axial movement of the first movable frame;
    a focusing mechanism having a single helicoid provided between the operating ring and the first movable frame, the helicoid and the axial guide means cooperating for axially shifting the first movable frame in response to the rotation of the operating ring and for causing the first movable frame to follow the axial movement of the operating ring;
    a second movable frame holding a lens group other than the first lens group;

a zoom ring supported by the cylinder capable of only axial movement;

a cam member supported by the cylinder for rotation about the axis of the cylinder;

first engaging means for engaging the zoom ring with the cam member for rotating the cam member in response to the axial movement of the zoom ring;

second engaging means for engaging the cam member with the second movable frame for axially shifting the second movable member in response to the rotation of the cam member; and wherein one of the zoom ring and the operating ring has a circumferential groove and the other of the zoom ring and the operating ring has an engaging portion engaging the circumferential groove, the zoom ring being coupled with the operating ring through the engagement between the engaging portion and the circumferential groove such that the zoom ring follows only the axial movement of the operating ring.

2. A lens barrel as defined in claim 1 wherein the means for engaging the zoom ring with the cam member comprises an axial grooved portion formed in one of the stationary cylinder and the cam member, a grooved cam portion formed in the other of the cylinder and the cam member, and a guide pin provided on the zoom ring and engaged in both the axial grooved portion and the grooved cam portion.

3. A lens barrel as defined in claim 1 wherein the means for engaging the cam member with the second movable frame comprises an axial grooved portion formed in one of the stationary cylinder and the cam member, a grooved cam portion formed in the other of the cylinder and the cam member, and a guide pin provided on the second movable frame and engaged in both the axial grooved portion and the grooved cam portion.

4. A lens barrel as defined in claim 1, wherein the axial guide means includes an axial groove provided on one of the cylinder and the first movable frame and a pin provided on the other of the cylinder and the first movable frame and engaging the axial groove.

5. A lens barrel as defined in claim 1, wherein the circumferential groove is provided in the inner periphery of the operating ring whereas the engaging portion is provided on the outer periphery of the zoom ring.

6. A lens barrel provided with an optical system having at least two movable lens groups, the first of the movable lens groups being movable for both focusing and zooming, the lens barrel comprising:

a stationary cylinder having an imaginary central axis;

an operating ring supported by the cylinder for both axial movement and rotation about the central axis of the cylinder, the operating ring being adapted to be rotated for focusing and to be axially moved for zooming;

a first movable frame having an attachment mounting portion at its front end and having means for holding the first movable lens group at its inner portion;

axial guide means provided between the first movable frame and the cylinder for permitting only axial movement of the first movable frame;

a focusing mechanism having a cam groove provided on one of the operating ring and the first movable frame, and a pin provided on the other of the operating ring and the first movable frame and engaging the cam groove, the cam groove, the pin and the axial guide means cooperating for axially shifting the first movable frame in response to the rotation of the operating ring and for causing the first movable frame to follow the axial movement of the operating ring;

a second movable frame holding a lens group other than the first lens group;

a zoom ring supported by the cylinder capable of only axial movement;

a cam member supported by the cylinder for rotation about the axis of the cylinder;

first engaging means for engaging the zoom ring with the cam member for rotating the cam member in response to the axial movement of the zoom ring; and second engaging means for engaging the cam member with the second movable frame for axially shifting the second movable member in response to the rotation of the cam member; and wherein one of the zoom ring and the operating ring has a circumferential groove and the other of the zoom ring and the operating ring has an engaging portion engaging the circumferential groove, the zoom ring being coupled with the operating ring through the engagement between the engaging portion and the circumferential groove such that the zoom ring follows only the axial movement of the operating ring.

7. A lens barrel as defined in claim 6, wherein the circumferential groove is provided in the periphery of the zoom ring, whereas the engaging portion is provided on the inner periphery of the operating ring.

8. A lens barrel as defined in claim 6, wherein the axial guide means includes an axial groove provided on one of the cylinder and the first movable frame and a pin provided on the other of the cylinder and the first movable frame and engaging the axial groove.

9. A lens barrel as defined in claim 6, wherein the means for engaging the zoom ring with the cam member comprises an axial grooved portion formed in one of the stationary cylinder and the cam member, a grooved cam portion formed in the other of the cylinder and the cam member, and a guide pin provided on the zoom ring and engaged in both the axial grooved portion and the grooved cam portion.

10. A lens barrel as defined in claim 6, wherein the means for engaging the cam member with the second movable frame comprises an axial grooved portion formed in one of the stationary cylinder and the cam member, a grooved cam portion formed in the other of the cylinder and the cam member, and a guide pin provided on the second movable frame and engaged in both the axial grooved portion and the grooved cam portion.

* * * * *

UNITED STATES PATENT OFFICE
CERTIFICATE OF CORRECTION

PATENT NO. : 4,315,670
DATED : February 16, 1982
INVENTOR(S) : Masaharu Shigoku

It is certified that error appears in the above-identified patent and that said Letters Patent are hereby corrected as shown below:

On The Title Page Insert:

--[30] FOREIGN APPLICATION PRIORITY DATA

November 17, 1978  Japan......................53-142527 --.

*Signed and Sealed this*

*Twenty-third* Day of *November 1982*

[SEAL]

*Attest:*

*Attesting Officer*

GERALD J. MOSSINGHOFF
*Commissioner of Patents and Trademarks*